(12) United States Patent
Rofougaran

(10) Patent No.: US 8,909,184 B2
(45) Date of Patent: *Dec. 9, 2014

(54) METHOD AND SYSTEM FOR SELECTING A WIRELESS SIGNAL BASED ON AN ANTENNA OR BIAS VOLTAGE

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,146

(22) Filed: Nov. 9, 2012

(65) Prior Publication Data

US 2013/0065524 A1 Mar. 14, 2013

Related U.S. Application Data

(63) Continuation of application No. 13/047,222, filed on Mar. 14, 2011, now Pat. No. 8,311,504, which is a continuation of application No. 11/536,676, filed on Sep. 29, 2006, now Pat. No. 7,907,926.

(51) Int. Cl.
*H04B 1/18* (2006.01)
*H04B 5/02* (2006.01)

(52) U.S. Cl.
CPC .................................. *H04B 5/02* (2013.01)
USPC ................... 455/277.1; 455/121; 455/41.1

(58) Field of Classification Search
USPC .............. 455/41.1, 41.2, 193.1, 193.2, 193.3, 455/269, 121, 277.1
See application file for complete search history.

(56) References Cited

U.S. PATENT DOCUMENTS

| | | | | |
|---|---|---|---|---|
| 5,491,715 A | * | 2/1996 | Flaxl | 375/344 |
| 5,680,106 A | * | 10/1997 | Schrott et al. | 340/10.33 |
| 6,122,494 A | * | 9/2000 | Tuttle | 455/193.1 |
| 7,260,369 B2 | * | 8/2007 | Feher | 455/133 |
| 7,271,727 B2 | * | 9/2007 | Steeves | 340/572.7 |
| 7,777,630 B2 | * | 8/2010 | Tuttle | 340/572.7 |
| 7,881,665 B2 | * | 2/2011 | Symons | 455/41.1 |
| 8,249,500 B2 | * | 8/2012 | Wilson | 455/41.1 |
| 2006/0160488 A1 | * | 7/2006 | Sueoka et al. | 455/41.2 |
| 2007/0077888 A1 | * | 4/2007 | Forster | 455/41.2 |
| 2008/0194200 A1 | * | 8/2008 | Keen et al. | 455/41.1 |
| 2009/0121835 A1 | * | 5/2009 | Borret et al. | 340/10.1 |
| 2010/0190436 A1 | * | 7/2010 | Cook et al. | 455/41.1 |

\* cited by examiner

*Primary Examiner* — Blane J Jackson
(74) *Attorney, Agent, or Firm* — Oblon, Spivak, McClelland, Maier & Neustadt, L.L.P.

(57) ABSTRACT

A method for wireless communication is provided and may include configuring at least one capacitor array in an antenna system to control a frequency for receiving external signals. An antenna and at least one inductor in the antenna system may be configured for receiving external signals at a first frequency. An inductor and a voltage source, a capacitor, and/or a ground reference may be configured for receiving the external signals at a different frequency if the frequency is utilized for backscattered signal reception and/or magnetically coupled signal reception. Near field communication (NFC) signals may be received at the different frequency for backscattered signals. Radio frequency identification (RFID) signals may be received at the different frequency for magnetically coupled signals. The first frequency may be within the FM frequency band. The antenna system may be configured to transmit signals to be subsequently received as backscattered signals or magnetically coupled signals.

20 Claims, 5 Drawing Sheets

METHOD AND SYSTEM FOR SELECTING A WIRELESS SIGNAL BASED ON AN ANTENNA OR BIAS VOLTAGE

This is a continuation of application Ser. No. 13/047,222 filed Mar. 14, 2011.

CROSS-REFERENCE TO RELATED APPLICATIONS/INCORPORATION BY REFERENCE

This application is a continuation of application Ser. No. 11/536,676 filed on Sep. 29, 2006. This application also makes reference to:
U.S. application Ser. No. 11/536,678, filed on Sep. 29, 2006;
U.S. Pat. No. 7,689,188, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,670, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. Pat. No. 7,830,981, filed on Sep. 29, 2006;
U.S. Pat. No. 7,729,670, filed on Sep. 29, 2006;
U.S. application Ser. No. 11/536,657, filed on Sep. 29, 2006;
U.S. application Ser. No. 11/536,662, filed on Sep. 29, 2006;
U.S. Pat. No. 7,634,246, filed on Sep. 29, 2006;
U.S. application Ser. No. 11/536,667, filed on Sep. 29, 2006;
U.S. Pat. No. 7,570,965, filed on Sep. 29, 2006;
U.S. application Ser. No. 11/536,656, filed on Sep. 29, 2006; and
U.S. application Ser. No. 11/536,663, filed on Sep. 29, 2006.

The above stated applications are hereby incorporated herein by reference in their entirety.

FIELD OF THE INVENTION

Certain embodiments of the invention relate to wireless communication. More specifically, certain embodiments of the invention relate to a method and system for utilizing a frequency modulation (FM) antenna for near field communication (NFC) and radio frequency identification (RFID).

BACKGROUND OF THE INVENTION

As portable electronic devices and wireless devices become more popular, an increasing range of mobility applications and services are emerging. There are well established radio broadcast services, utilizing the amplitude modulation (AM) and/or frequency modulation (FM) frequency bands that allow reception of audio information and/or data at an FM receiver.

Radio frequency identification (RFID) is a data collection technology that enables the storing and remote retrieval of data utilizing devices referred to as RFID tags, or transponders. An RFID tag may comprise a silicon integrated circuit, or chip, and an antenna that enables the RFID tag to receive and respond to radio frequency (RF) queries from an RFID transceiver. The RFID tag may comprise memory, for example a random access memory (RAM) or an electrically erasable programmable read only memory (EEPROM), which enables storage of data. The data may comprise an electronic product code (EPC) that may be utilized to locate an item to which the RFID tag is attached. For example, libraries may attach RFID tags to books to enable the tracking of books that are checked out to library patrons. RFID tags may be integrated into plastic, credit card sized devices referred to as "smart cards." The RFID tags in smart cards may enable storage of account information that enables the holder of the smart card to purchase goods and services. The smart card, for example, may store a current balance that indicates a monetary value of goods and services that may be purchased with the smart card. The smart card holder may purchase goods and services by holding the smart card in the proximity of an RFID transceiver that retrieves account information from the smart card. The RFID transceiver may, for example, decrease the current balance to reflect purchases and store the updated value in the smart card. The RFID transceiver may also increase the current balance when the user purchases additional monetary value.

Near field communication (NFC) is a communication standard that enables wireless communication devices, such as cellular telephones, SmartPhones, and personal digital assistants (PDAs) to establish peer-to-peer (P2P) networks. NFC may enable electronic devices to exchange data and/or initiate applications automatically when they are brought in close proximity, for example ranging from touching, or 0 cm, to a distance of about 20 cm.

NFC may enable downloading of images stored in a digital camera, to a personal computer, or downloading of audio and/or video entertainment to MP3 devices, or downloading of data stored in a SmartPhone to a personal computer, or other wireless device, for example. NFC may be compatible with smart card technologies and may also be utilized to enable purchase of goods and services. RFID applications and NFC applications may utilize a common RF band.

However, integrating the disparate mobility applications and services into a single device may be costly. Some conventional portable electronic device, for example, may utilize separate antennas, hardware, and/or software for the reception, transmission, and/or processing of signals associated with the various mobility applications and services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for utilizing a frequency modulation (FM) antenna for near field communication (NFC) and radio frequency identification (RFID), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a frequency modulation (FM) antenna for near field communication (NFC) and radio frequency identification (RFID). Aspects of a system for utilizing an FM antenna for NFC and RFID may comprise configuring an antenna to receive signals in the FM frequency band, or to receive signals in the NFC and RFID frequency band. An exemplary FM frequency band utilized in most of the world may comprise a range of frequencies from about 87.5 MHz to about 108 MHz. An exemplary frequency utilized for NFC and/or RFID signals is about 13.5 MHz.

One embodiment of the invention may comprise an FM antenna that may be utilized for NFC and/or RFID. In this regard, a tuning control block may enable configuration of at least one capacitor array to control a frequency for reception of signals. A processor may enable configuration of an antenna for the reception of signals wherein the frequency for the received signals is utilized for FM signal reception, and at least one of: NFC signal reception, and RFD signal reception.

Figure 1:
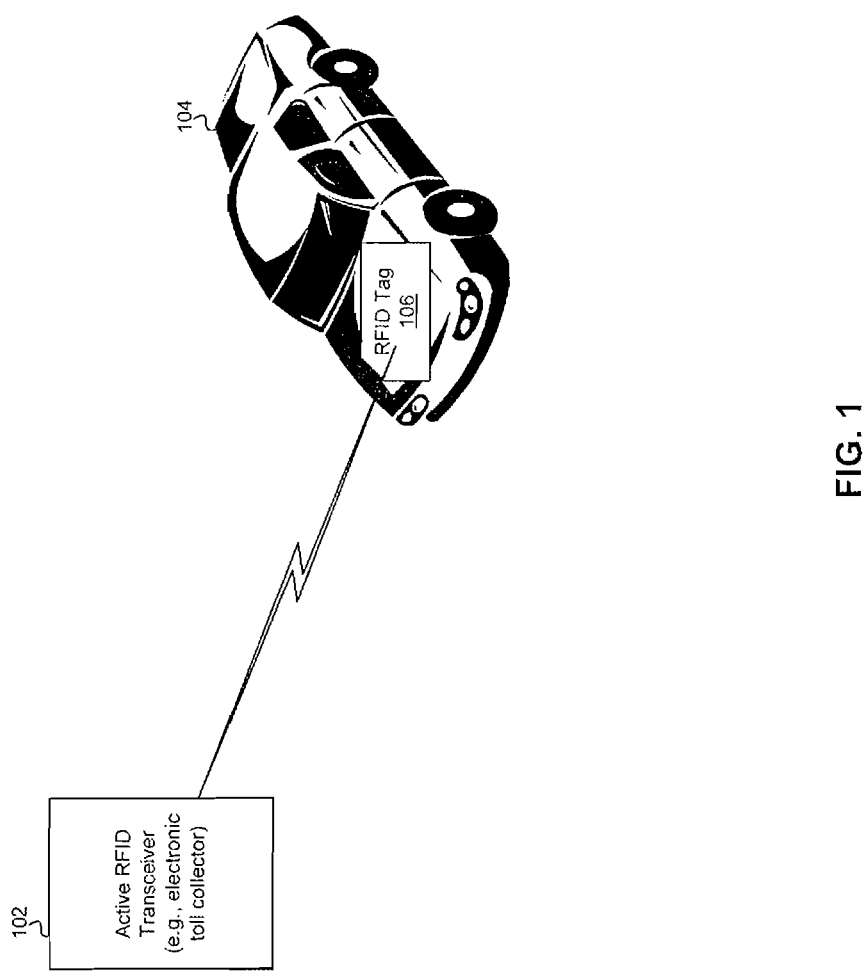
FIG. 1 is a diagram illustrating an exemplary radio frequency identification (RFID) system, which may be utilized in connection with an embodiment of the invention.

FIG. 1 is a diagram illustrating an exemplary radio frequency identification (RFID) system, which may be utilized in connection with an embodiment of the invention. Referring to FIG. 1, there is shown an RFID transceiver 102, an automobile 104, and an RFID tag 106. FIG. 1 may illustrate an electronic toll collection application in which the RFID transceiver 102, located at a toll plaza, communicates with the RFID tag 106 when the automobile 104 is in the vicinity of the toll plaza. The RFD transceiver 102 may be referred to as an "active" device in that it may transmit beacon signals in an attempt to detect RFID tags 106 that may be in the vicinity of the toll plaza. The RFID tag 106 may be referred to as a "passive" device in that it may comprise a battery that enables it to autonomously transmit signals. However, the RFID tag 106 may detect electromagnetic energy from a signal transmitted by the RFID transceiver 102. The signal transmitted by the RFID transceiver 102 may provide a sufficient power level that enables the RFID tag 106 to retrieve stored data and to transmit a signal to the RFID transceiver 102 in response. The responding signal may be transmitted by a process referred to as backscattering in that the responding signal may utilize signal energy from the corresponding received signal. The frequency of the backscattered signal may be about the same as the frequency of the corresponding received signal. Backscattering may require that the antenna, located within the RFID tag 106, be configured to designed to collect electromagnetic energy from the signal transmitted by the RFID transceiver 102, and to transmit the responding signal.

Figure 2:
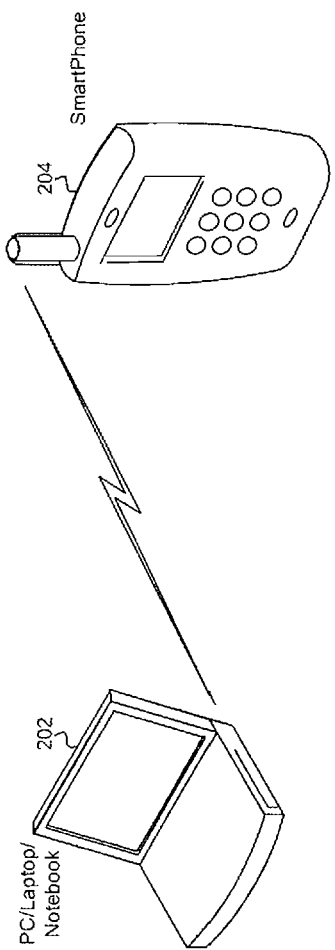
FIG. 2 is a diagram illustrating a near field communication (NFC) system, which may be utilized in connection with an embodiment of the invention.

FIG. 2 is a diagram illustrating an near field communication (NFC) system, which may be utilized in connection with an embodiment of the invention. Referring to FIG. 2, there is shown a personal computer (PC) 202, and a SmartPhone 204. FIG. 2 may illustrate download of data stored in a SmartPhone 204, such as an address book, to a PC 202.

When a device, such as the SmartPhone 204 attempts to transmit data, it may generate electromagnetic field in its proximate vicinity. The PC 202 may detect corresponding electromagnetic energy, which may cause initiation of an NFC P2P communication. The SmartPhone 204 may generate a signal based on the data to be transmitted, which may cause variations in the electromagnetic field. The PC 202 may detect variations in the corresponding electromagnetic energy that may enable the PC 202 to receive the data transmitted by the SmartPhone 204.

Figure 3A:
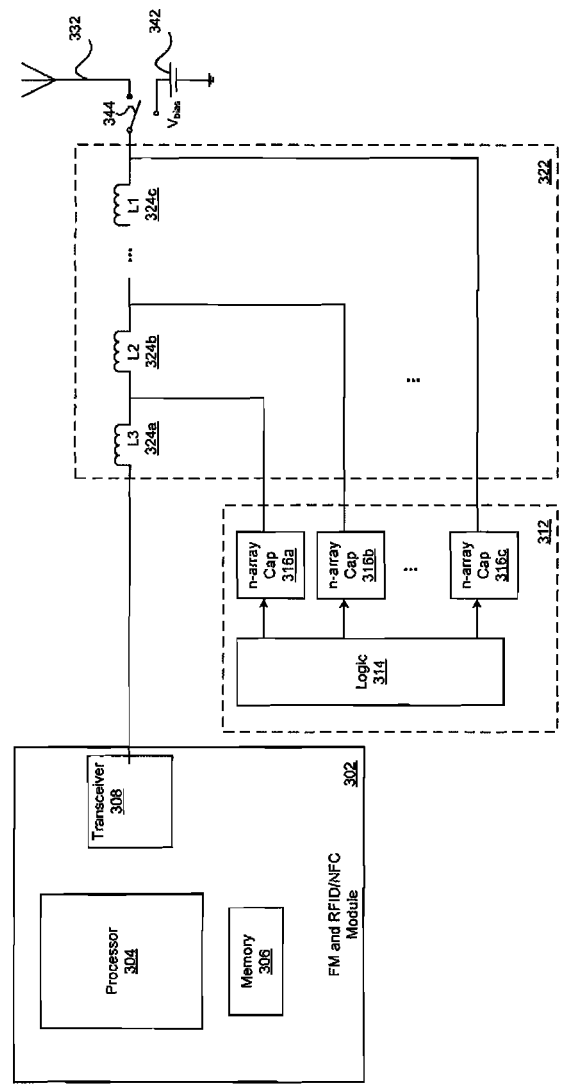
FIG. 3A is a block diagram of an exemplary system for utilizing a frequency modulation (FM) antenna for NFC and RFID, in accordance with an embodiment of the invention.

FIG. 3A is a block diagram of an exemplary system for utilizing a frequency modulation (FM) antenna for NFC and RFID, in accordance with an embodiment of the invention. Referring to FIG. 3A, there is shown an FM and RFID/NFC module 302, a tuning control block 312, an inductive circuit block 322, a voltage source $V_{bias}$ 342, a switch 344, and an antenna 332. The FM and RFID/NFC module 302 may comprise a processor 304, a memory 306, and a transceiver 308. The tuning control block 312 may comprise a control block 314, and a plurality of capacitor arrays 316a, 316b, ..., and 316c.

The capacitor arrays 316a, 316b, ..., and 316c may each comprise a plurality of capacitive elements whose capacitances may be added to effectively form different capacitors with different capacitances.

The processor 304 may generate control signals that enable an NFC-enabled device, such as a SmartPhone 204, to transmit and/or receive data in a communication based on NFC P2P standards. The processor 304 may also process received data and/or enable the transmission of subsequent data in response to the received data. The processor 304 may execute code that enables determination of when to initiate and/or terminate an NFC P2P communication.

The processor 304 may also generate control signals that enable an RFID-enabled device, such as an RFID transceiver 102 and/or RFID tag 106, to transmit and/or receive data in a communication based on RFID standards. The processor 304 may enable execution of code that initiates and/or terminates an RFID communication. The processor 304 may also process received data and/or enable the transmission of subsequent data in response to the received data. The processor 304 may enable an RFID transceiver 102 to periodically transmit beacon signals at distinct time instants.

The processor 304 may generate control signals that enable a communication device, such as a SmartPhone 204, to receive FM signals. The processor 304 may execute code that enables processing of received data, for example processing digital data transmitted in an FM radio station broadcast to produce an audio signal that may output to a speaker and/or processing supplemental program data related to the audio signal.

The memory 306 may comprise suitable logic, circuitry, and/or code that may be utilized to store, or write, and/or retrieve, or read, information, data, and/or executable code. The memory 306 may enable storage and/or retrieval of data that may be utilized in an RFID communication, an NFC communication, or for reception of FM signals. This data may comprise account information, identification and/or authentication codes, or preset station selections for reception of FM radio station broadcasts, for example. The memory 306 may comprise a plurality of random access memory (RAM) technologies such as, for example, DRAM, and/or nonvolatile memory, for example electrically erasable programmable read only memory (EEPROM).

The transceiver 308 may comprise suitable logic, circuitry and/or code that enables generation of signals to transmit data, or recovery of data in received signals. The transceiver 308 may enable selection of a frequency at which signals may be transmitted. For example, the transceiver 308 may generate a frequency that is about 13.5 MHz when transmitting signals in an NFC communication, or in an RFID communication.

The transceiver 308 may also enable selection of a frequency at which signals may be received. For example, the transceiver 308 may select a frequency within the range 87.5 MHz to 108 MHz when receiving an FM signal, or a frequency that is about 13.5 MHz when receiving a signal in an NFC communication, or in an RFID communication.

The control block 314 may comprise suitable logic, circuitry, and/or code that may enable control of capacitance that may be associated with each of the capacitor arrays 316a, 316b, . . . , and 316c. The inductive elements 324a, 324b, . . . , and 324c may be connected in a series configuration. Each of the capacitor arrays 316a, 316b, . . . , and 316c may be coupled to a node in the inductive circuit block 322. For example, the capacitor array 316a may be coupled to the node between the inductors 324a and 324b, the capacitor array 316b may be coupled to a node between the inductors 324b and 324c, and the capacitor array 316c may be coupled to a node between the inductor 324c and the switch 344.

In operation, the processor 304 may configure the system as shown in FIG. 3A to receive an FM signal. The processor 304 may generate a control signal that causes the switch 344 to couple the antenna 332 and the inductor 324c. The processor 304 may retrieve data from the memory 306 that enables selection of a frequency within the FM frequency range. The processor 304 may generate control signals that enable the transceiver 308 to receive an FM signal at the selected frequency. The processor 304 may generate control signals that enable the tuning control block 312 to generate a modified version of the selected frequency, which may be utilized to receive an FM signal at the modified version of the selected frequency. The control block 314 may select a capacitance for each of the capacitive arrays 316a, 316b, . . . , and 316c by enabling individual capacitive elements to be used for receiving RF signals from the mobile terminal antenna 332. Accordingly, the impedance of the circuit may be varied, and accordingly, the center frequency and/or the bandwidth associated with the mobile terminal antenna 332 may be adjusted.

The processor 304 may configure the system as shown in FIG. 3A to receive an RFID signal and/or an NFC signal. The processor 304 may generate a control signal that causes the switch 344 to couple the inductor 324c and the voltage source $V_{bias}$ 342. The voltage source 342 may enable an electromagnetic field may be generated by the inductors 324a, 324b, . . . , and 324c. The processor 304 may generate control signals that enable the transceiver 308 to detect the strength of the electromagnetic field and/or variations in the strength of the electromagnetic field. The transceiver 308 may be configured to detect variations that occur at a frequency of about 13.5 MHz. The control block 314 may select a capacitance for each of the capacitive arrays 316a, 316b, . . . , and 316c by enabling individual capacitive elements to be used for receiving RFID signals and/or NFC signals. The selection of capacitance for each of the capacitive arrays 316a, 316b, . . . , and 316c may generate a modified version of the frequency at which variations in the electromagnetic field may occur, and be detected by the transceiver 308. The transceiver 308 may receive data in a signal based on detected variations in the strength of the electromagnetic field. The received data may be communicated to the processor 304 and/or memory 306.

The processor 304 may configure the system as shown in FIG. 3A to transmit an RFID signal and/or an NFC signal. The processor 304 may generate a control signal that causes the switch 344 to couple the inductor 324c and the voltage source $V_{bias}$ 342. The voltage source 342 may enable an electromagnetic field may be generated by the inductors 324a, 324b, . . . , and 324c. The processor 304 may generate data and/or retrieve data from the memory 306 that may be transmitted in the RFID signal and/or NFC signal. The processor 304 may communicate the data to the transceiver 308 and generate control signals that enable the transceiver 308 to generate RFID signals and/or NFC signals for transmitting the data. The signals generated by the transceiver 308 may be communicated to the inductive circuit block 322. The transceiver may generate signals that cause variations in the strength of electromagnetic field generated by the inductors 324a, 324b, . . . , and 324c. The variations may occur at a frequency of about 13.5 MHz.

In various embodiments of the invention, the voltage source $V_{bias}$ 342 may be replaced by a capacitor, or a ground reference (GND) when configuring the system shown in FIG. 3A to transmit and/or receive an RFID signal and/or an NFC signal. In one exemplary embodiment of the invention utilizing a capacitor, the processor 304 may generate a signal that causes the switch 344 to couple the inductor 324c and the capacitor. In one exemplary embodiment of the invention utilizing the GND, the processor may generate a signal that causes the switch 344 to couple the inductor 324c to GND.

Various embodiments of the invention may be practiced in an RFID transceiver 102, and/or in an RFID tag 106. Various embodiments of the invention may be practiced in an NFC device such as a PC 202 and/or SmartPhone 204. In various embodiments of the invention, the inductive circuit block 322 and tuning control block 312 may be implemented utilizing differential circuitry. The transceiver 308 may enable generation and/or reception of differentially encoded signals.

Figure 3B:
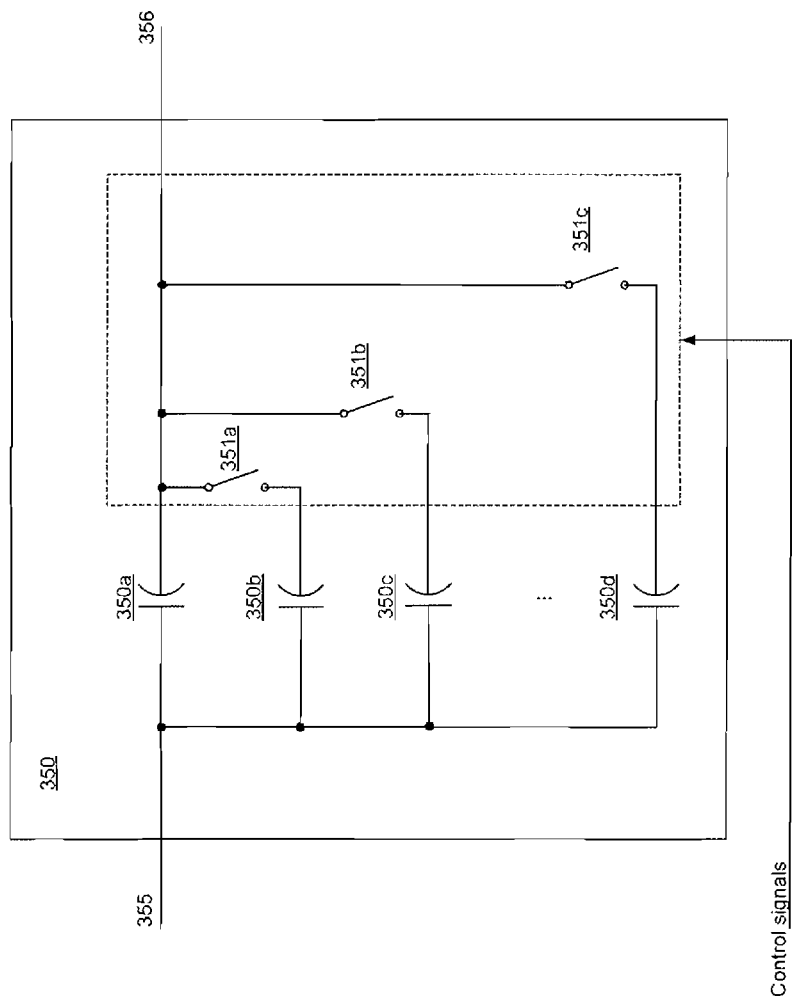
FIG. 3B is a block diagram illustrating an exemplary n-array capacitor block that may be utilized for dynamically tuning an antenna, in accordance with an embodiment of the invention.

FIG. 3B is a block diagram illustrating an exemplary n-array capacitor block that may be utilized for dynamically tuning an antenna, in accordance with an embodiment of the invention. Referring to FIG. 3B, there is shown the capacitive array 350, which may be similar to the capacitive arrays 316b, 316b, . . . , and 316c. The capacitive array 350 may comprise the capacitive elements 350a, 350b, 350c, . . . , and 350d, the switches 351a, 351b, . . . , and 351c, and the output nodes 355 and 356.

The control block 314 may control whether each of the switches 351a, 351b, . . . , and 351c may be open or closed via the control signals to the capacitive array 350. If a switch is open, the corresponding capacitive element 350b, 350c, . . . , 350d, respectively, may not be part of a circuit that receives the RF signals from the antenna 332, or part of the circuit that receives and/or transmits NFC and/or RFID signals. Conversely, if a switch is closed, the corresponding capacitive element may be part of the circuit that receives the RF signals, as well as being part of the circuit that receives and/or transmits NFC and/or RFID signals. Accordingly, the impedance of the circuit that receives the RF signals may be adjusted by opening or closing the switches 351a, 351b, . . . , and 351c. Similarly, the impedance of the circuit that receives NFC and/or RFID signals may be adjusted by opening or closing the switches 351a, 351b, . . . , and 351c. Adjusting the impedance in this manner may adjust the center frequency and/or the bandwidth of the antenna 332.

The control block 314 may receive communication, for example, from the processor 304 regarding the center frequency drift for the antenna 332. The communication from the processor 304 may comprise, for example, detailed information regarding switch positions for each capacitive array 316a, 316b, ..., and 316c. Accordingly, the control block 314 may only need nominal processing to open or close the various switches 351a, 351b, ..., 351c in the capacitive arrays 316a, 316b, ..., and 316c. Other embodiments of the invention may communicate signal integrity indicators, for example, received signal strength indication and/or bit error rate, to the control block 314. The control block 314 may then process the signal integrity indicators to determine the center frequency drift, and proper adjustments that may be needed to compensate for the drift. The control block 314 may then open or close the various switches 351a, 351b, ..., 351c in the capacitive arrays 316a, 316b, ..., and 316c to adjust the center frequency and/or the bandwidth. Still other embodiments of the invention may allocate processing between the processor 304 and the control block 314. For example, the processor 304 may determine the amount of shift in the center frequency, while the control block 314 may determine a specific configuration for the capacitive arrays 316a, 316b, ..., and 316c based on the amount of frequency compensation needed.

Figure 4:
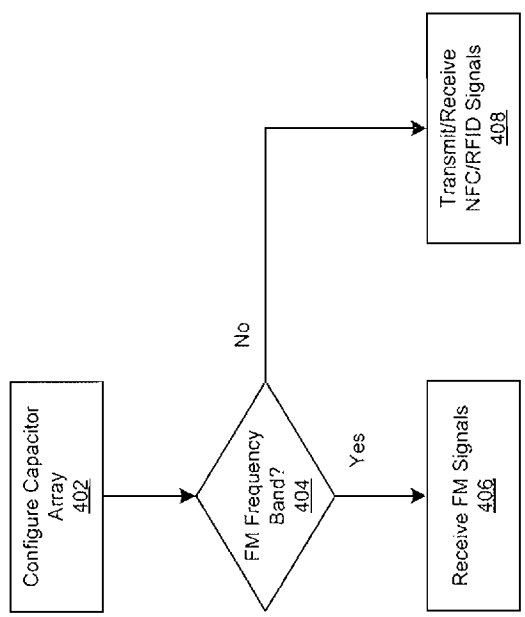
FIG. 4 is a flow chart illustrating exemplary steps for utilizing an FM antenna for NFC and RFID, in accordance with an embodiment of the invention.

FIG. 4 is a flow chart illustrating exemplary steps for utilizing an FM antenna for NFC and RFID, in accordance with an embodiment of the invention. Referring to FIG. 4, in step 402, the processor 304 may generate control signals that cause the control block 314 to configure each of the capacitive arrays 316a, 316b, and 316c. In step 404, the processor 304 may determine a frequency band that may be utilized for receiving and/or transmitting signals. When the FM frequency band is selected in step 404, in step 406, the processor 304 may configure the transceiver 308, and the switch 344, to receive FM signals. When the FM frequency band is not selected in step 404, in step 408, the processor 304 may configure the transceiver 308, and the switch 344, to transmit and/or receive NFC signals and/or RFID signals.

Aspects of a system for utilizing an FM antenna for NFC and RFID may comprise a tuning control block 312 that enables configuration of at least one capacitor array 316a, 316b, ..., or 316c, to control a frequency for reception of signals. A processor 304 may enable configuration of an antenna 332 for the reception of signals wherein a frequency for the received signals is utilized for FM signal reception, NFC signal reception, or RFID signal reception.

The processor 304 may enable configuration of the antenna 332, and at least one inductor 324a, 324b, ..., and 324c, for FM signal reception. The processor may enable configuration of at least one inductor 324a, 324b, ..., and 324c, and a voltage source $V_{bias}$ 342, for NFC signal reception, or for RFID signal reception. The transceiver 308 may enable detection of electromagnetic energy in a wireless medium via one or more of the inductors 324a, 324b, ..., 324c for NFC signal reception, or for RFID signal reception. The processor 304 may enable selection of a frequency for RFID signal reception. The selected frequency may be modified for RFID signal reception based on the configuration of one or more capacitor arrays 316a, 316b, ..., or 316c. The processor 304 may enable selection of a frequency for NFC signal reception. The selected frequency may be modified for NFC signal reception based on the configuration of one or more capacitor arrays 316a, 316b, ..., or 316c.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for wireless communication, said system comprising:
    a radio frequency (RF) receiver configured to receive a wireless signal; and
    a control circuit configured to:
        utilize said wireless signal for frequency modulation (FM) radio broadcast signal reception, near field communications (NFC) signal reception, or radio frequency identification (RFID) signal reception; and
        couple a bias voltage to one or more inductors when a frequency of the wireless signal is utilized for NFC signal reception or RFID signal reception.

2. The system of claim 1, wherein said control circuit is configured to select said frequency of said wireless signal by adjusting a capacitance of one or more capacitive arrays.

3. The system of claim 2, wherein each of said one or more capacitive arrays comprises a plurality of switches configured to couple one or more of a plurality of capacitors to each of said one or more capacitive arrays.

4. The system of claim 1, wherein said bias voltage comprises one of a voltage source, a capacitor and a ground reference.

5. The system of claim 1, wherein said frequency of said wireless signal utilized for said FM radio broadcast signal reception is between 87.5 MHz and 108 MHz.

6. The system of claim 1, wherein said frequency of said wireless signal utilized for said NFC signal reception or RFID signal reception is approximately 13.5 MHz.

7. The system of claim 1, wherein said control circuit is configured to compensate for a center frequency drift of said wireless signal by adjusting a capacitance of one or more capacitive arrays.

8. The system of claim 1, wherein said RF receiver enables detection of electromagnetic energy in a wireless medium for said NFC signal reception or RFID signal reception.

9. The system of claim 8, wherein said RF receiver receives data in said wireless signal based on detected variations in a strength of said electromagnetic energy.

10. The system of claim 1, wherein the control circuit is further configured to:
   couple the one or more inductors to an antenna when the frequency of the wireless signal is utilized for FM radio broadcast signal reception.

11. A method for wireless communication, said method comprising:
   receiving, by a radio frequency (RF) receiver, a wireless signal;
   utilizing, by control circuit, the wireless signal for frequency modulation (FM) radio broadcast signal reception, near field communications (NFC) signal reception, or radio frequency identification (RFID) signal reception; and
   coupling, by the control circuit, a bias voltage to one or more inductors when a frequency of the wireless signal is utilized for NFC signal reception or RFID signal reception.

12. The method of claim 11, further comprising:
   selecting, by the control circuit, the frequency of the received wireless signal by adjusting a capacitance of one or more capacitive arrays.

13. The method of claim 11, wherein said bias voltage comprises one of a voltage source, a capacitor and a ground reference.

14. The method of claim 11, wherein said frequency of said received wireless signal utilized for said FM radio broadcast signal reception is between 87.5 MHz and 108 MHz.

15. The method of claim 11, wherein said frequency of said received wireless signal utilized for said NFC signal reception or RFID signal reception is approximately 13.5 MHz.

16. The method of claim 11, wherein said control circuit is configured to compensate for a center frequency drift of said received wireless signal by adjusting a capacitance of one or more capacitive arrays.

17. The method of claim 11, wherein said RF receiver enables detection of electromagnetic energy in a wireless medium for said NFC signal reception or RFID signal reception.

18. The method of claim 17, wherein said RF receiver receives data in said received wireless signal based on detected variations in a strength of said electromagnetic energy.

19. The method of claim 12, wherein each of said one or more capacitive arrays comprises a plurality of switches configured to couple one or more of a plurality of capacitors to each of said one or more capacitive arrays.

20. The method of claim 11, further comprising:
   coupling the one or more inductors to an antenna when the frequency of the wireless signal is utilized for FM radio broadcast signal reception.

* * * * *